J. BRADT.
Bee Hive.
No. 55,998.
Patented July 3, 1866.
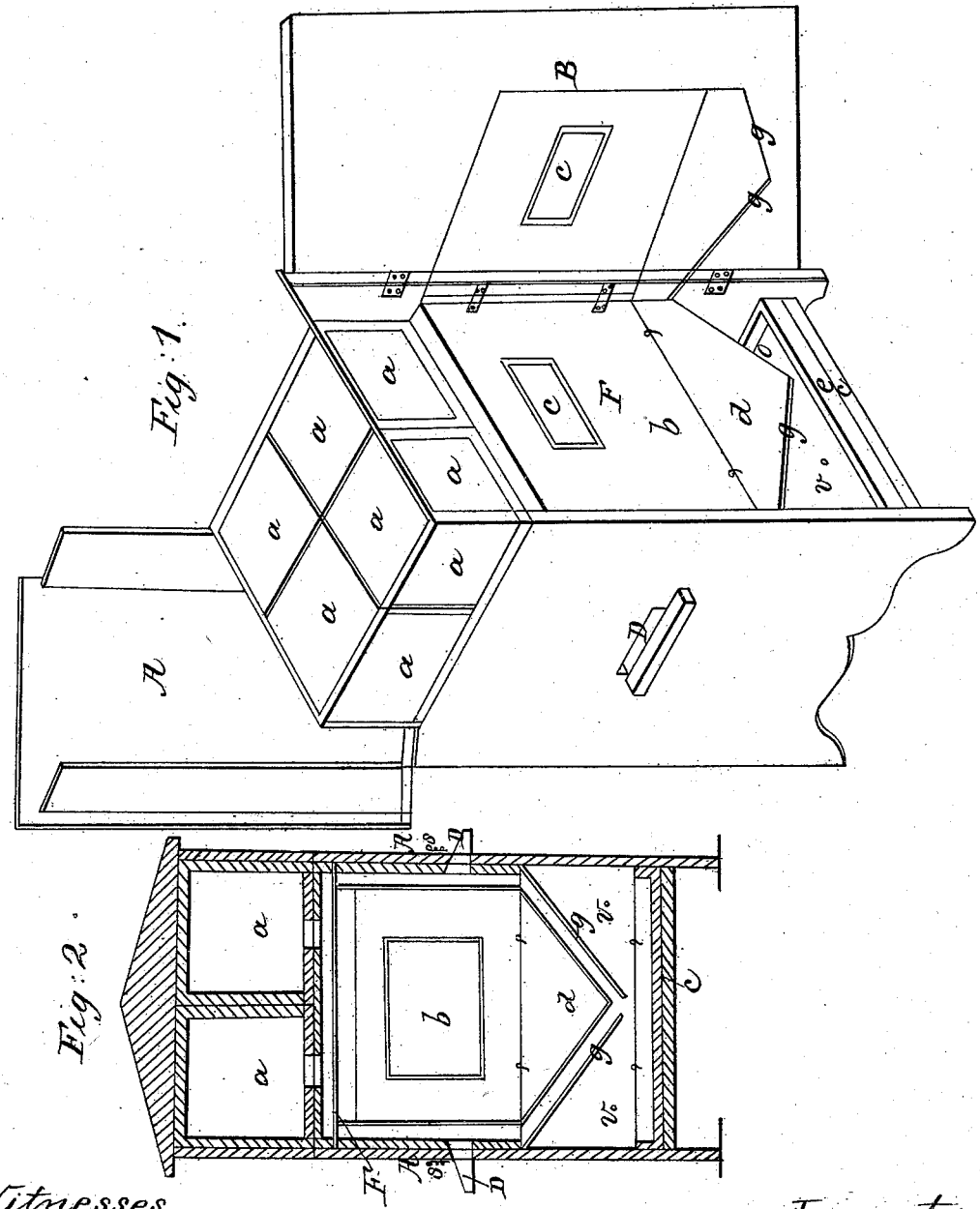

UNITED STATES PATENT OFFICE.

JOSEPH BRADT, OF LA PORTE, INDIANA.

IMPROVEMENT IN BEE-HIVES.

Specification forming part of Letters Patent No. 55,998, dated July 3, 1866.

*To all whom it may concern:*

Be it known that I, JOSEPH BRADT, of La Porte, in the county of La Porte, and in the State of Indiana, have invented a new and useful Improvement in Bee-Hives; and I do hereby declare that the following is a full and exact description thereof, reference being had to the accompanying drawings, and to the letters of reference marked thereon, in which—

Figure 1 is a perspective view of the hive with the door open. Fig. 2 is a vertical section through the center of the hive.

To enable others skilled in the art to make and use my invention, I will describe its construction and operation.

In the construction of my invention, in Fig. 1 A is the hive; B, the door; C, the bottom; D, the aperture for the entrance of the bees, with a ledge attached, on which the bees alight, with a regulator or shutter that will close the hive partly or firmly, as it may require, as shown by letter $s$; $a$, the honey-boxes, which rest upon the main hive or bee-box. The boxes $a$ are constructed with openings, which correspond with the openings of the main hive or box, which allow the bees to pass up through for the purpose of depositing the spare honey for table use, and when filled they can be removed and others set in their place. By means of the glass in these boxes it can be seen when they are filled sufficient to remove.

$b$ is the main hive or bee-box. This box has the movable frames F, so arranged as to be at an equal distance apart, with triangular pieces at the top for the bees to build their comb to. These frames are so arranged at the bottom as to correspond with the sheet-iron conductors below, that will allow the worms and dead bees to pass through to the bottom drawer, that can be emptied at pleasure. The front E of this main box is also hung on hinges, so as to open and take out the frames in front, a great convenience in case the bees should connect their combs. The outside box or hive has the top cut apart, with hinges on the back, so as to turn it over, a great convenience for removing the drawers or honey-boxes.

$c$ is a glass to see into the main hive and to see the working of the bees; $d$, the swinging flap, which corresponds with the shape of the projecting bottom or sheet-iron conductors. This flap or front tin is hung on hinges, so as to raise or lower, if required.

$e$ is the drawer, which is below the main hive or box, into which all dirt or filth falls, and which is easily removed to empty all extraneous matter out of it.

There is no bottom to the main hive but the two inclined metallic pieces $g$. These, with the flap $d$, serve as a bottom by which the moth or miller cannot ascend in the hive, but must remain on the bottom till emptied out.

This arrangement of the hive $b$ with inclined bottom sides, $g$, and flap $d$ is, for practical use, an important one, as I have found, as I keep the hive clean and clear of all extraneous substances and prevent moth or bee-flies from annoying the bees.

V is the two ventilating-holes, with buttons at the bottom of the main hive, below the sheet-iron conductors, that will allow the bees to pass out that fall below, and also gives the bees plenty of fresh air, that keeps them healthy summer and winter, and will allow the entrance of the hive to be shut through cold weather.

A is the top, thrown up on its hinges, giving a full view of the top drawers or honey-boxes as they set in the hive.

Having thus described my invention, what I claim as new, and desire to secure by Letters Patent, is—

The arrangement of the doors B and E, flap $d$, inclined plates $g$ $g$, comb-frames F, and hinged cap A, substantially as and for the purposes set forth.

JOSEPH BRADT.

Witnesses:
JAMES B. BELFORD,
JOHN WALTON.